(12) United States Patent
Flade et al.

(10) Patent No.: US 11,287,281 B2
(45) Date of Patent: Mar. 29, 2022

(54) ANALYSIS OF LOCALIZATION ERRORS IN A MOBILE OBJECT

(71) Applicant: Honda Research Institute Europe GmbH, Offenbach/Main (DE)

(72) Inventors: Benedict Flade, Offenbach/Main (DE); Julian Eggert, Offenbach/Main (DE); Axel Koppert, Graz (AT); Simon Kohaut, Frankfurt am Main (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 0 days.

(21) Appl. No.: 17/105,510

(22) Filed: Nov. 26, 2020

(65) Prior Publication Data

US 2021/0156711 A1 May 27, 2021

(30) Foreign Application Priority Data

Nov. 27, 2019 (EP) ..................................... 19211901

(51) Int. Cl.
*G01C 21/30* (2006.01)
*G01S 19/40* (2010.01)
*G01C 21/00* (2006.01)

(52) U.S. Cl.
CPC ..... *G01C 21/3844* (2020.08); *G01C 21/3807* (2020.08)

(58) Field of Classification Search
CPC .................... G01C 21/3844; G01C 21/3807
See application file for complete search history.

(56) References Cited

U.S. PATENT DOCUMENTS

| 5,394,333 A | 2/1995 | Kao |
| 6,024,655 A | 2/2000 | Coffee |
| 6,931,322 B2 | 8/2005 | Jung et al. |
| 2016/0236683 A1 | 8/2016 | Eggert et al. |

FOREIGN PATENT DOCUMENTS

| CN | 110231636 | 9/2019 |
| JP | H0868653 | 3/1996 |

OTHER PUBLICATIONS

Oliver Pink, "Visual map matching and localization using a global feature map," 2008 IEEE Computer Society Conference on Computer Vision and Pattern Recognition Workshops, Jun. 23-28, 2008, pp. 1-7.
Wenjie Lu; et al., "Lane Marking-Based Vehicle Localization Using Low-Cost GPS and Open Source Map," Unmanned systems, Aug. 24, 2015, pp. 1-13.

(Continued)

*Primary Examiner* — Mathew Franklin Gordon
(74) *Attorney, Agent, or Firm* — JCIPRNET

(57) ABSTRACT

The invention relates to a method for analyzing localization errors, wherein the method includes the steps of obtaining relative positions and absolute positions of an object moving within a mapped environment, which are generated sequentially over time, calculating differences between the relative positions and absolute positions to determine sequential localization errors, and decomposing the localization errors into a systematic error that is dependent on the orientation of the object and into a systematic error that is independent on the orientation of the object by analyzing the intrinsic dynamics of the localization errors.

12 Claims, 10 Drawing Sheets

(56) References Cited

OTHER PUBLICATIONS

Benedict Flade; et al., "Lane Detection Based Camera to Map Alignment Using Open-Source Map Data," 2018 21st International Conference on Intelligent Transportation Systems (ITSC), Nov. 4-7, 2018, pp. 1-9.
Zhencheng Hu; et al., "Real-time data fusion on tracking camera pose for direct visual guidance," IEEE Intelligent Vehicles Symposium, 2004, Jun. 14-17, 2004, pp. 842-847.
Greg Welch; et al., "An Introduction to the Kalman Filter," TR 95-041 Department of Computer Science, University of North Carolina Jul. 24, 2006, pp. 1-16.
Zui Tao; et al., "Road-Centered Map-Aided Localization for Driverless Cars Using Single-Frequency GNSS Receivers," Journal of Field Robotics, May 2017, pp. 1-47.
Nico Steinhardt, "An architecture for the estimation of kinematicvehicle parameters with integrated quality assessment by sensor data fusion," doctoral thesis with partial English translation, Department of Mechanical Engineering, Darmstadt University of Technology, Jul. 8, 2014, pp. 1-227.
David Betaille; et al., "Creating Enhanced Maps for Lane-Level Vehicle Navigation," IEEE Transactions on Intelligent Transportation Systems, Dec. 2010, pp. 786-798.
Jesse Levinson; et al., "Map-Based Precision Vehicle Localization in Urban Environments," Robotics: Science and Systems III, Jun. 2007, pp. 1-8.
Tim Caselitz; et al., "Monocular camera localization in 3d lidar maps." 2016 IEEE/RSJ International Conference on Intelligent Robots and Systems (IROS), Oct. 9-14, 2016, pp. 1-6.
"Search Report of Europe Counterpart Application", dated May 14, 2020 p. 1-p. 6.

ANALYSIS OF LOCALIZATION ERRORS IN A MOBILE OBJECT

CROSS-REFERENCE TO RELATED APPLICATION

This application claims the priority benefit of European application serial no. 19211901.4, filed on Nov. 27, 2019. The entirety of the above-mentioned patent application is hereby incorporated by reference herein and made a part of this specification.

TECHNICAL FIELD OF THE DISCLOSURE

The invention relates to a method and an apparatus for analyzing localization errors. More specifically, the invention relates to a method for decomposing errors of a position estimation into different systematic error components.

BACKGROUND

The estimation of the current position of an object is important in automotive navigation systems and driver assistance systems for autonomous or partially autonomous driving. For tasks such as situation prediction or lane level navigation, accurate localization of the ego-vehicle and of other entities within a map is crucial. Other entities can be, e.g., further vehicles that are sensed by the ego-vehicle, traffic signs, landmarks, pedestrians as well as anything else that are objects of the environment.

In general, Global Navigation Satellite Systems (GNSS) such as GPS, GLONASS, BeiDou or Galileo are used for absolute localization in order to estimate an absolute position with respect to a global reference frame and usually provide meter-level accuracy. In order to improve this accuracy, those systems are enhanced, augmented and complemented. Examples of augmentations are Differential GNSS (D-GNSS), Real-Time Kinematic GNSS (RTK-GNSS) and Precise Point Positioning (PPP) where data from base stations is used to generate correction data and to improve the localization signal. By using correction data from base stations, only spatially correlated errors can be corrected, but no errors that are local to the receiver.

Further, in O. Pink, "Visual map matching and localization using a global feature map," 2008 IEEE Computer Society Conference on Computer Vision and Pattern Recognition Workshops, Anchorage, Ak., 2008, an offset value (e.g. planar, spatial and/or rotational) is determined that helps to determine a mismatch between heterogeneous sources of information such as a map and GNSS-based vehicle positions. Such approaches are suitable for improving the position with regard to the map but do not allow an improvement of either map or positioning in an absolute sense since errors of several sources are superimposed.

U.S. Pat. No. 5,394,333 A discloses a navigation system using a GPS receiver in combination with dead reckoning and map data, in which the position determined by the GPS receiver is compared with the calculated position (Dead Reckoning) in order to choose the position that is more likely to be correct. However, in U.S. Pat. No. 5,394,333 A, the source of the error is not determined. The same applies to the navigation systems disclosed in U.S. Pat. No. 6,931,322 B2, in which a map matching technique is combined with GNSS and Dead Reckoning to correct position errors.

W. Lu, S. A. Rodriguez F., E. Seignez, and R. Reynaud, "Lane marking based vehicle localization using low-cost GPS and open source map," Unmanned Systems, vol. 03, no. 04, pp. 239-251, 2015 discloses a lane marking based vehicle localization, in which error models coupled to open source map data consist of a localization, a detection and a map component. However, the detected map errors are limited to the topological level, like wrongly assigned number of lanes, and merely the presence of localization failure is detected based on the error model for the localization.

U.S. Pat. No. 6,024,655 A discloses a method for calibrating and updating positions of golf carts, wherein navigation and yardage measurement systems are calibrated by employing map matching techniques. However, in U.S. Pat. No. 6,024,655 A, errors in the map data are not determined. Even if the error in the map data is constant, total error varies and must be determined and corrected continually.

Offsets between a map and the ego-vehicle position can be detected, but it is not possible to trace back the source of the error.

It is an object of the present invention to overcome the above-mentioned drawbacks and to provide an improved method for analyzing localization errors and improving localization. More specifically, it is an object of the invention to provide a method and apparatus for analyzing localization errors, a driver assistance system and a vehicle comprising such apparatus, with which the localization errors can be traced back to the sources causing them.

SUMMARY

This object is achieved by a method, an apparatus, a driver assistance system and a vehicle.

According to the present invention, a method for analyzing localization errors includes the steps of obtaining, from position estimation modules, relative positions and absolute positions of an object moving within a mapped environment, which are generated sequentially over time, calculating differences between the relative positions and absolute positions to determine sequential localization errors, and decomposing the localization errors into unrelated error components by analyzing the intrinsic dynamics of the localization errors.

According to the present invention, an apparatus for analyzing localization errors is configured to carry out the method as outlined above. The apparatus can be said object and locates itself or gets as input the relative positions and the absolute positions, calculates the differences and decomposes the localization errors, in particular, decomposes the difference vectors.

The apparatus can be a handheld device or can be implemented in an automotive navigation system or a driver assistance system.

According to the present invention, a vehicle comprises the driver assistance system as outlined above. The vehicle can be a car, motorbike, ship or aircraft.

BRIEF DESCRIPTON OF THE DRAWINGS

The invention is to be explained more detailed in the following with reference to the accompanying drawing.

Figure 1:
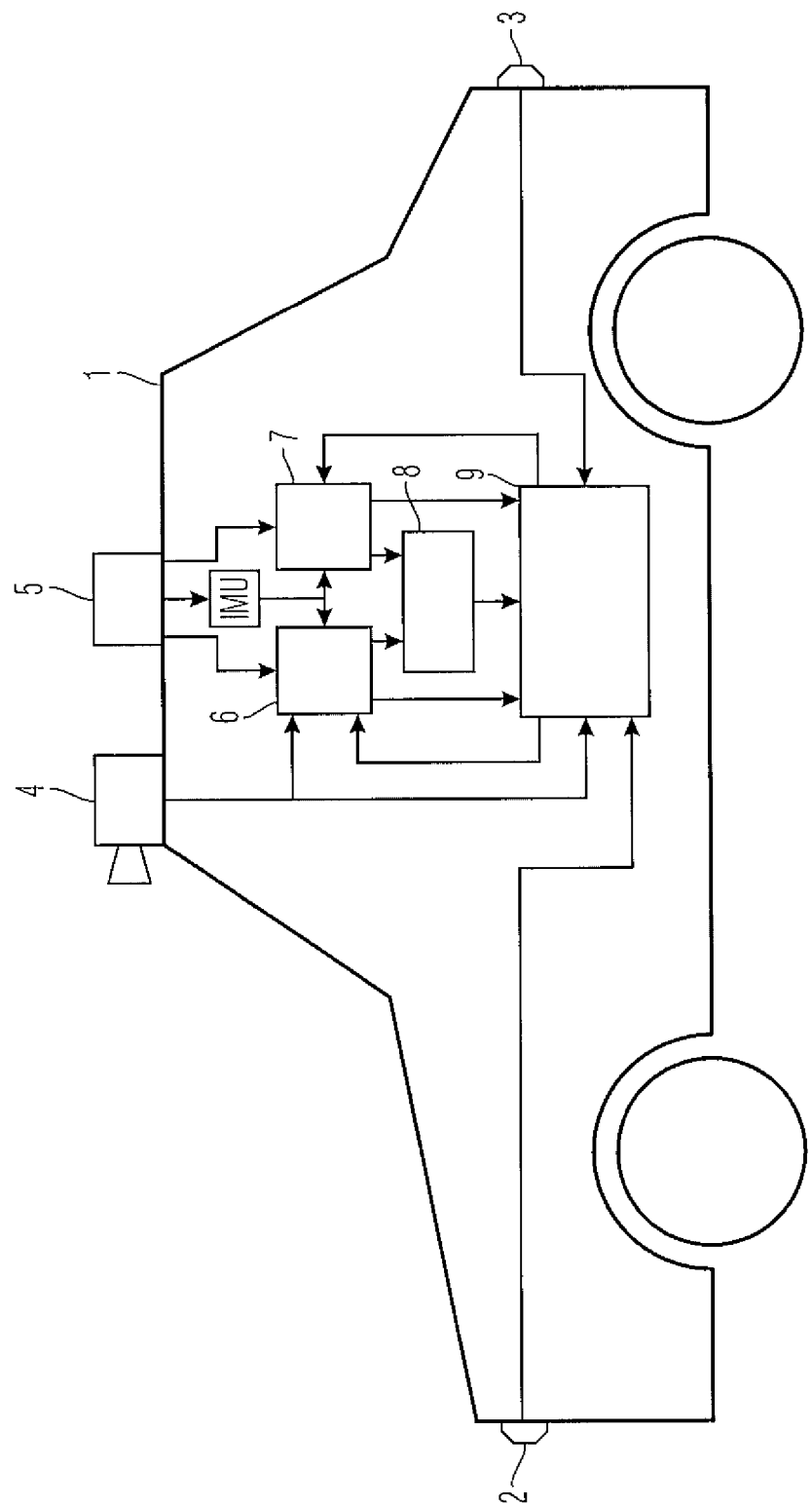
FIG. 1 shows a vehicle according to an embodiment of the present invention.

The same features are denoted in the figures by the same reference signs.

DETAILED DESCRIPTION

In the context of the present invention, the localization error is defined as a difference vector between localization data provided by independent localization modules, one determining the relative position and one the absolute position. It is to be noted that the term "relative position" refers to coordinates in the same coordinate system as the absolute position to enable calculation of a difference vector d and the coordinates are determined based on knowledge or assumption of the position of the relative frame to the absolute frame, e.g. a map to the earth frame.

In the step of calculating differences between the relative positions and absolute positions to determine sequential localization errors, the differences are calculated for a specific point in time respectively. In particular each difference is calculated for a specific relative position and a specific absolute position obtained at a same point in time.

With the present invention, relative and absolute positions that relate to the same coordinate system (navigation frame), to the same object and to the same time are combined sequentially over time and the localization errors in the combined positions are decomposed into two error types/components that can be assigned to different sources (unrelated sources).

The unrelated error components may comprise a systematic error that is dependent on the orientation of the object and a systematic error that is independent of the orientation of the object. Such orientation independent error may in particular be constant or dependent on a position.

In particular, an error that depends on the orientation of a moving object is bound to the physical system (e.g. ego-vehicle) and results from miscalibrated/misplaced sensors (e.g. GNSS sensor) within the physical system (moving object), whereas an error that is independent on the orientation of the moving object is bound to the navigation frame and results from erroneous map creation (e.g. translation, rotation).

With the results of the error analysis, sensor data, for example, calibration data and observation data, and/or map data can be corrected or the sensors and/or Map Alignment process can be (re)calibrated. The correction/calibration can be performed during normal use of a navigation device or merely in test/calibration operation. The determined correction/calibration data can be used to correct/calibrate structurally identical sensors and/or modules in other devices.

In the obtaining step, the absolute positions can be obtained from one of the position estimation modules, which is an absolute position estimation module by using at least one sensor.

In the obtaining step, the relative positions can be obtained from one other of the position estimation modules, which is a map-relative position estimation module, in which a location of the object in a map is determined, wherein the method further comprises a step of correcting the map or the determined location based on the systematic error that is independent on the orientation of the object.

The step of calibrating the at least one sensor based on the systematic error that is dependent on the orientation of the object may in particular calibrate the sensor with regard to another sensor.

The method may further comprise a step of calibrating at least one of the position estimation modules based on the systematic error that is dependent on the orientation of the object. In particular, a center (position) of one of the position estimation modules may be corrected with regard to the center (position) of the respective one other position estimation module.

Alternatively or in addition, at least one of the relative positions and the absolute positions can be estimated based on dead reckoning. The method may further comprise a step of correcting the calculated position estimated based on dead reckoning based on the systematic error that is dependent on the orientation of the object.

In the calculating step, difference vectors between the relative positions and absolute positions can be calculated, so that a sequence of the difference vectors for the moving object is generated, wherein each difference vector is calculated from a relative position and an absolute position that relate to the same time.

In addition, in the decomposing step, magnitudes and directions of the difference vectors can be evaluated, wherein the magnitudes indicate error values, constant directions indicate the systematic error independent from the orientation of the object and non-constant directions indicate the systematic error dependent on the orientation of the object.

The systematic error independent from the orientation (orientation independent error) is constant in the navigation frame. The systematic error dependent from the orientation (orientation dependent error) is orientation dependent in the navigation frame. The systematic error dependent from the orientation is, however, constant in the body frame.

The body frame refers to a frame that is fixed to the object, e.g. described in x, y, z coordinates. The navigation frame refers to absolute coordinates, e.g. described in east, north and elevation coordinates.

In the decomposing step, the localization errors can be decomposed by a sequential estimator, in particular a recursive estimator, an Unscented Kalman Filter or even a model learning algorithm to obtain the error components.

Concerning the localization, two cases can be separated: a) Absolute localization, which describes the task of localizing an entity with regard to a global reference frame e.g. by using a GNSS sensor, and b) Map-Relative localization where the localization is performed with regard to an underlying map etc.

Under the assumption that the map is correctly referenced in the global reference frame and a perfect representation of the environment, these two cases become the same task. One approach to map-relative localization is the so-called Camera to Map Alignment, which allows for map-relative localization by comparing map data with visual data acquired by a vehicle mounted camera.

In both cases, strong assumptions, e.g. with regard to map accuracy and potential offsets, define the success of the localization task. Common approaches either enhance global positioning by utilizing maps that are accurate in a global sense or achieve some map-relative estimate. In contrast, the present invention builds on top of both.

FIG. 1 shows a side view of an ego-vehicle 1 equipped with the inventive system for assisting a driver in driving the ego-vehicle 1. The assistance may be provided in the form of warnings or recommendations to the driver in dangerous situations with respect to other traffic participants and/or in the form of autonomously or partially autonomously driving the ego-vehicle 1.

The ego-vehicle 1 may be any type of vehicle including, but not limited to, cars, trucks, motorcycles, busses, and reacts to surrounding objects (traffic participants), such as pedestrians, automobiles, and bicycles.

In FIG. 1, a front radar 2, a rear radar 3 and a camera 4 sensing the environment around the ego-vehicle 1 are mounted on a front surface of the ego-vehicle 1, a rear surface of the ego-vehicle 1 and the roof of the ego-vehicle 1, respectively. The camera 4 is positioned so that a surveillance in the driving direction of the ego-vehicle 1 is possible. Alternatively or in addition, a stereo camera system and/or lidar sensors can be mounted on the ego-vehicle 1. A position sensor 5, e.g. a GNSS sensor, is mounted on the ego-vehicle 1 and detects the position of the ego-vehicle 1.

The driver assistance system of the ego-vehicle 1 further comprises a first localization module 6, a second localization module 7, a hybrid decomposition module 8 and a computer 9 including a processor and a memory that receives or acquires the signals from the front radar 2, the rear radar 3, the camera 4, the first localization module 6, the second localization module 7, the hybrid decomposition module 8 and status data of the ego-vehicle 1, such as vehicle speed, steering angle, engine torque, brake actuation, from of at least one vehicle controller, ECU (not shown).

The first localization module 6 and the second localization module 7 are specific examples for position estimation modules. The first localization module 6 estimates a map relative position of the ego-vehicle 1 based on the sensor data of the position sensor 5, the signals of the camera 4 and map data received from the computer 9 by using, for example, so-called Camera to Map Alignment (C2MA). The first localization module 6 may use OpenStreetMap data as a source for raw road geometry data.

Such Camera to Map Alignment, which is using a Relational Local Dynamic Map (R-LDM) for road data storage and OpenStreetMap as data source is disclosed in B. Flade, M. Nieto, G. Velez, and J. Eggert, "Lane detection based camera to map alignment using open-source map data," in 2018 IEEE 21st International Conference on Intelligent Transportation Systems (ITSC) IEEE, 2018.

In the implementation of the Camera to Map Alignment, a world model that consists of segments and junctions is used while an intersection may consist of an arbitrary amount of junctions. Start and end of a road segment is defined by intersections. At first start, the current segment is selected by projecting the absolute position to the closest map segment. Furthermore, crossing a junction, or more specifically reaching a new segment resets the longitudinal (x-direction in body frame) position to zero. The body frame refers to a frame that is fixed to the ego-vehicle 1 (e.g. described in x, y, z coordinates) while the navigation frame refers to absolute coordinates (e.g. described in east, north and elevation coordinates).

In the implementation, the Camera to Map Alignment is used for lateral position correction (y-direction in body frame) only. Longitudinal information is then computed by integrating IMU measurements of acceleration and turn rate, as known from state of the art dead reckoning systems.

Map-relative positioning is also described in Z. Hu and K. Uchimura, "Real-time data fusion on tracking camera pose for direct visual guidance," in 2004 IEEE Intelligent Vehicles Symposium (IV), June 2004, pp. 842-847 and US 2016/0236683 A1.5

The second localization module 7 estimates a filtered absolute geographic position of the ego-vehicle 1 based on the sensor data of the position sensor 5 by using a basic inertial navigation system comprising of a global navigation satellite system (GNSS) and an Inertial Measurement Unit (IMU) to complement the sensor data, and an Extended Kalman Filter. Kalman Filters are described, for example, in G. Welsh and B. Gary, "An introduction to the Kalman filter" (1995).

The IMU may alternatively be a separate structural unit, which provides filtering and prediction of GNSS data provided by the position sensor 5, and supplies filtered and predicted position data to both the first localization module 6 and the second localization module 7.

In this way, the GNSS system, which is vulnerable to signal related errors and problems during acquiring and tracking the signal, e.g., due to reflections in urban canyons or unavailability of the signal, e.g., due to tunnels, is complemented by the IMU that allows for a filtering and prediction of the GNSS positions.

In the case of IMU, sensors are used to filter the received GNSS, which allows for improving as well as bridging the raw signal generated by the position sensor 5. Such approach is disclosed in Z. Tao, P. Bonnifait, V. Fremont, J. Ibanez-Guzman, and S. Bonnet, "Road-centered map-aided localization for driverless cars using single frequency gnss receivers," Journal of Field Robotics, vol. 34, no. 5, pp. 1010-1033, August 2017; N. Steinhardt: "Eine Architektur zur Schätzung kinematischer Fahrzeuggrößen mit integrierter Qualitätsbewertung durch Sensordatenfusion", VDI-Verlag, Darmstadt; and D. Betaille and R. Toledo-Moreo, "Creating enhanced maps for lanelevel vehicle navigation," IEEE Transactions on ITS, vol. 11, no. 4, pp. 786-798, December 2010.

The first localization module 6 corresponds to the absolute position estimation module. The second localization module 7 corresponds to the map relative position estimation module. Both the first localization module 6 and the second localization module 7 can comprise one sensor or, alternatively, a plurality of sensors. A sensor may be part of one or of both the first localization module 6 and the second localization module 7. For example, in FIG. 5, a position sensor 5 in the form of a GNSS sensor is included in the first localization module 6 and the second localization module 7.

The first localization module 6 and the second localization module 7 each provide a position information of a center (position, logical center) of the respective localization module. The relative position estimated by the first localization module 6 and the absolute position estimated by the second localization module 7 are supplied to the computer 9 that uses the estimated positions for navigation and/or for calculating/predicting a trajectory of the ego-vehicle 1 during autonomously or partially autonomously driving.

According to the present invention, the estimated positions are also supplied to the hybrid decomposition module 8 that analyzes the estimated positions to determine localization errors, wherein the hybrid decomposition module 8 decomposes the errors into different systematic error components by analyzing the intrinsic dynamics of the error sequence. The term error sequence refers to the errors in successive estimated positions.

The analysis is based on the idea that independent systematic errors can be detected from combinations of successive estimated positions, wherein the combinations include a first combination of a first relative position estimated by the first localization module 6 and the respective first absolute position estimated by the second localization module 7, a second combination of a second relative position estimated by the first localization module 6 and the respective second absolute position estimated by the second localization module 7, . . . etc.

The hybrid decomposition module 8 determines two types of error:

First, errors Φ that depend on the ego-vehicle's orientation. Common reasons are, e.g. miscalibrated sensors (e.g. GNSS). This can be understood as an erroneous belief in the location (position and orientation) of a sensor within the physical system (e.g. ego-vehicle); and, second, errors K that are not bound to the ego-vehicle's orientation. One common example for orientation independent errors are systematic errors induced by erroneous map creation (e.g. translation, rotation). In the case of such errors, the position estimate is independent from the aforementioned orientation dependent error.

Figure 2A:
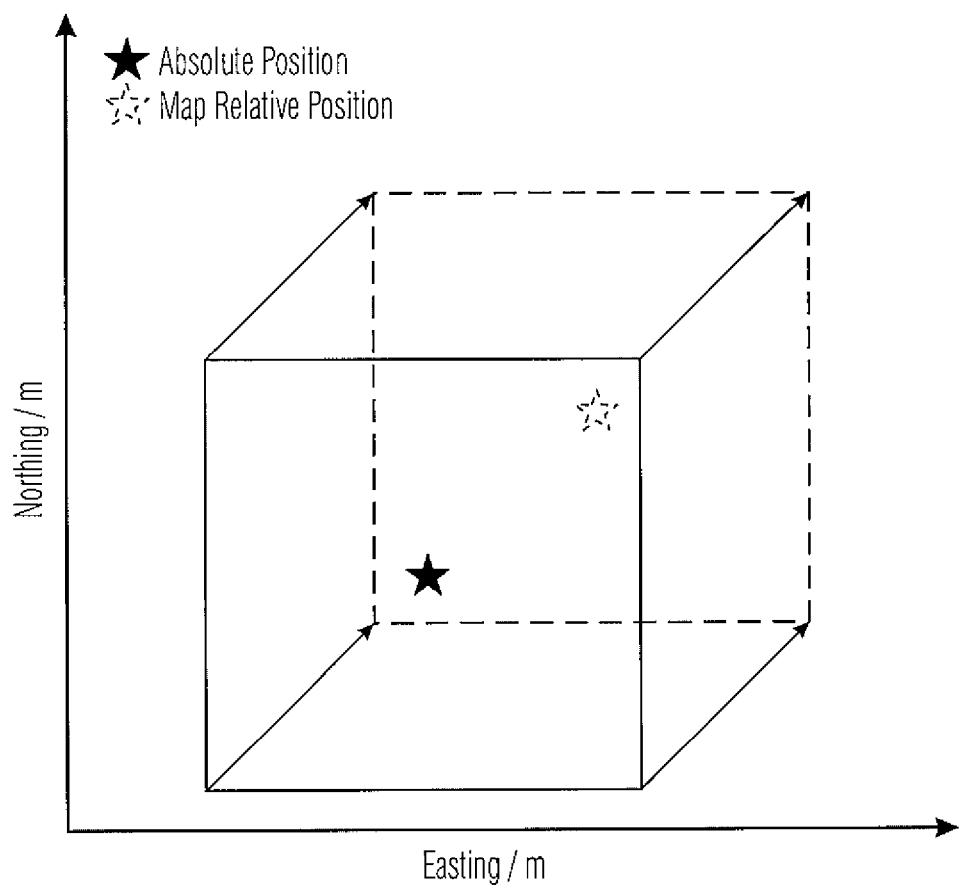
FIG. 2a shows a translation error in a navigation frame.
Figure 2B:
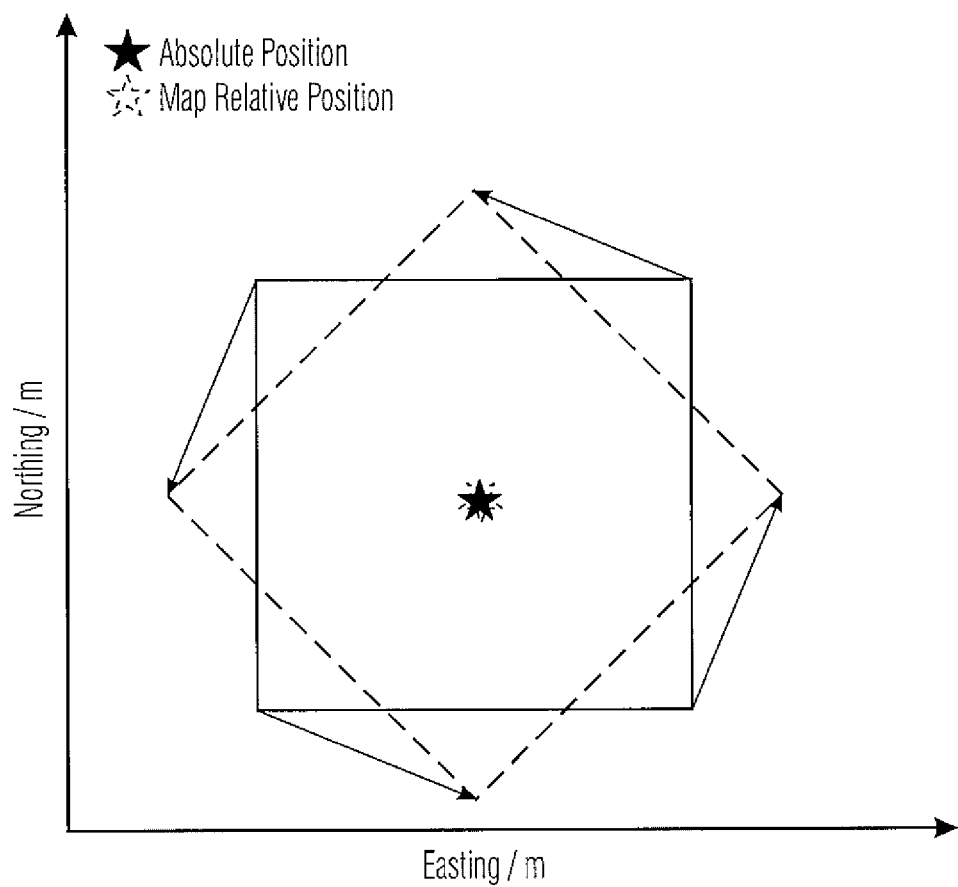
FIG. 2b shows a rotation error in a navigation frame.
Figure 2C:
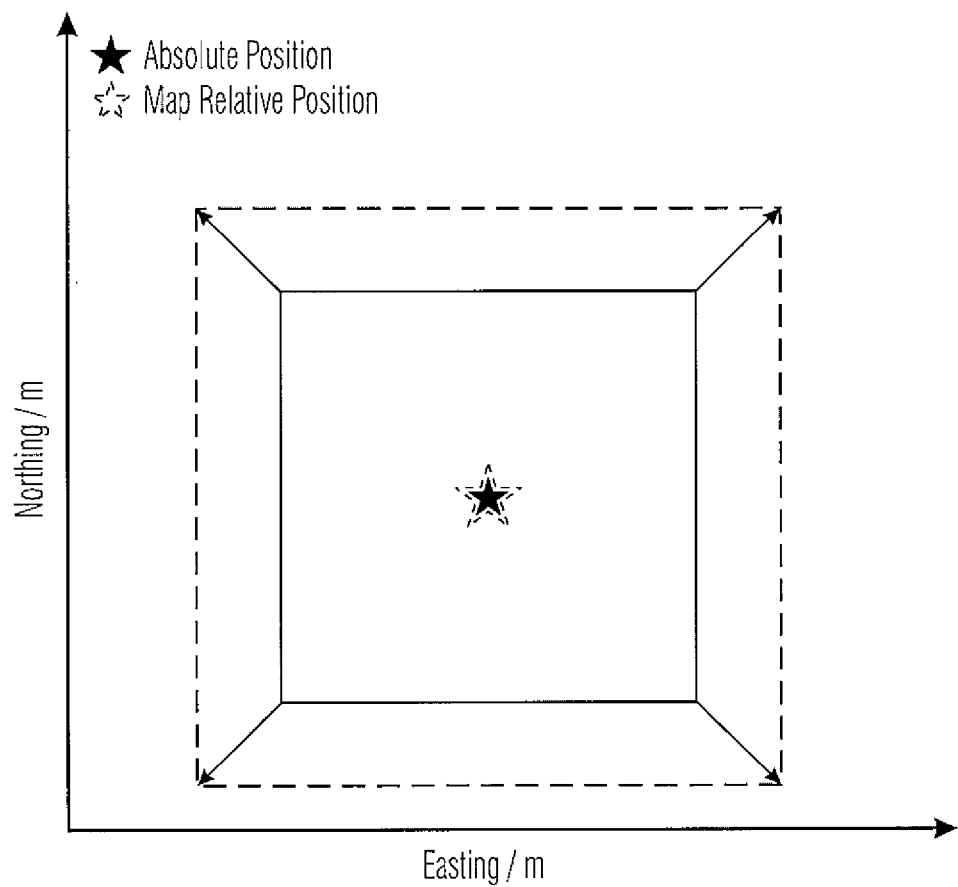
FIG. 2c shows a scaling error in a navigation frame.

FIG. 2a to FIG. 2c illustrate three examples of error models for orientation-independent offsets, in which an absolute (correct) position is affected by erroneous map creation. FIG. 2a shows a translation error, FIG. 2b shows a rotation error and FIG. 2c shows a scaling error in navigation frame. The further explanations will focus on translation errors but in the very same manner apply to the other orientation-independent errors.

Figure 3:
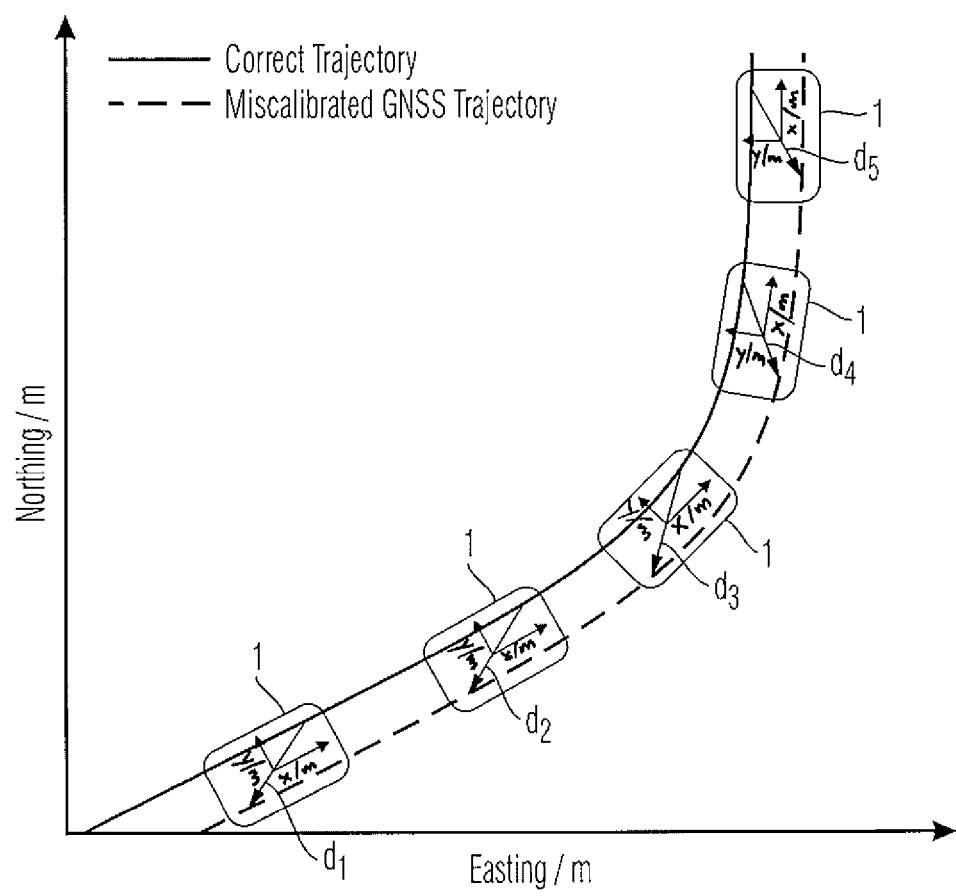
FIG. 3 shows an example of orientation-dependent error in a navigation frame.

FIG. 3 shows a real/correct trajectory of the ego-vehicle 1 (solid line) and a trajectory determined based on positions that are estimated using a miscalibrated sensor setup (dashed line), wherein each of the vectors d1 . . . d5 indicates the difference between a position of the correct trajectory and the respective incorrect position estimated based on the miscalibrated GNSS trajectory for one specific point in time. The error/offset shown in FIG. 3 is caused by a translation of the position sensor 5 and is an orientation-dependent error Φ. While this offset (or more specifically the direction of its vector d1 . . . d5) is constant with respect to the ego-vehicle 1 or rather its the body frame, the vector d1 . . . d5 is varying over the trajectory with respect to the navigation frame.

Figure 4:
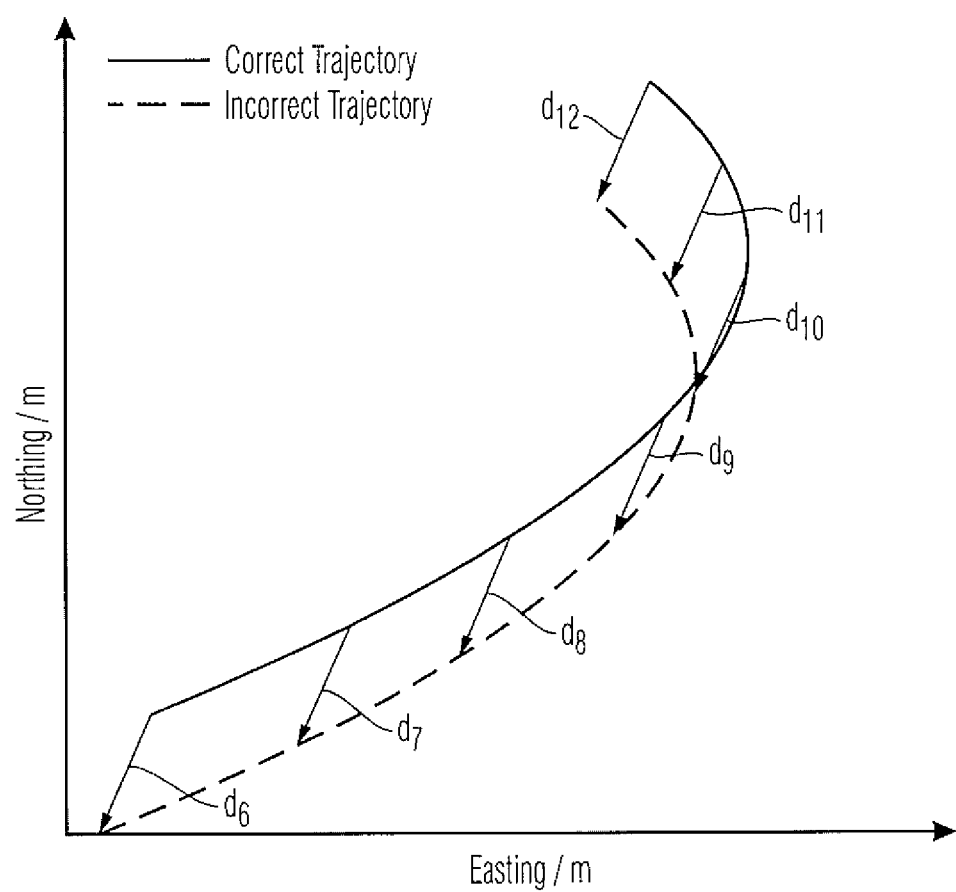
FIG. 4 shows an example of orientation-independent error in a navigation frame.

FIG. 4 shows a correct trajectory of the ego-vehicle 1 (solid line) and a trajectory determined based on estimated positions that are affected by erroneous map creation, wherein each of the vectors d6 . . . d12 indicates the difference between a position of the correct trajectory and the respective incorrect position of the estimated trajectory for a plurality of successive points in time. The error/offset shown in FIG. 4 is caused by a translation of a road segment in the map (see FIG. 2a) and is an orientation-independent error K. While the vectors d6 . . . d12 of the error K are constant in the navigation frame, they vary with respect to the body frame.

It is to be noted that FIGS. 3 and 4 are merely intended to explain the difference between orientation dependent errors in case of solely a calibration error (FIG. 3) and an orientation independent error in case of solely a map translation error (FIG. 4). However, the hybrid decomposition module 8 calculates a difference vector d based on the outputs of the first localization module 6 and the second localization module 7. The difference vector d is calculated from the outputs of the localization modules 6 and 7 as a difference between the positions estimated by the localization module 6 and the localization module 7. The calculation is repeated for successive points in time.

The errors Φ and K can be determined using online-learning techniques (e.g. Kalman Filters) with the difference vector d as an input. In particular, Extended Kalman Filters (EKF) or Unscented Kalman Filters (UKF) as online error estimator can be used, since it is suitable for capturing non-linearity in state and measurement space while being computationally inexpensive.

Based on the mutual independence of both systematic errors Φ and K, they sum up to the vector d by the combination. Since the difference vector d results from a linear combination (sum) of the two independent errors Φ and K, the true decomposition and thus the identification of the systematic errors cannot be computed from single measurements as described above. Instead, the decomposition is estimated by observing the dynamics of the difference vector d over time. More specifically, the difference vector d can be modeled as $$d = \Phi + K + \varepsilon,$$

with ε being the noise of the system and Φ and K being the errors that depend on the object's/vehicle's state as described above.

Figure 5:
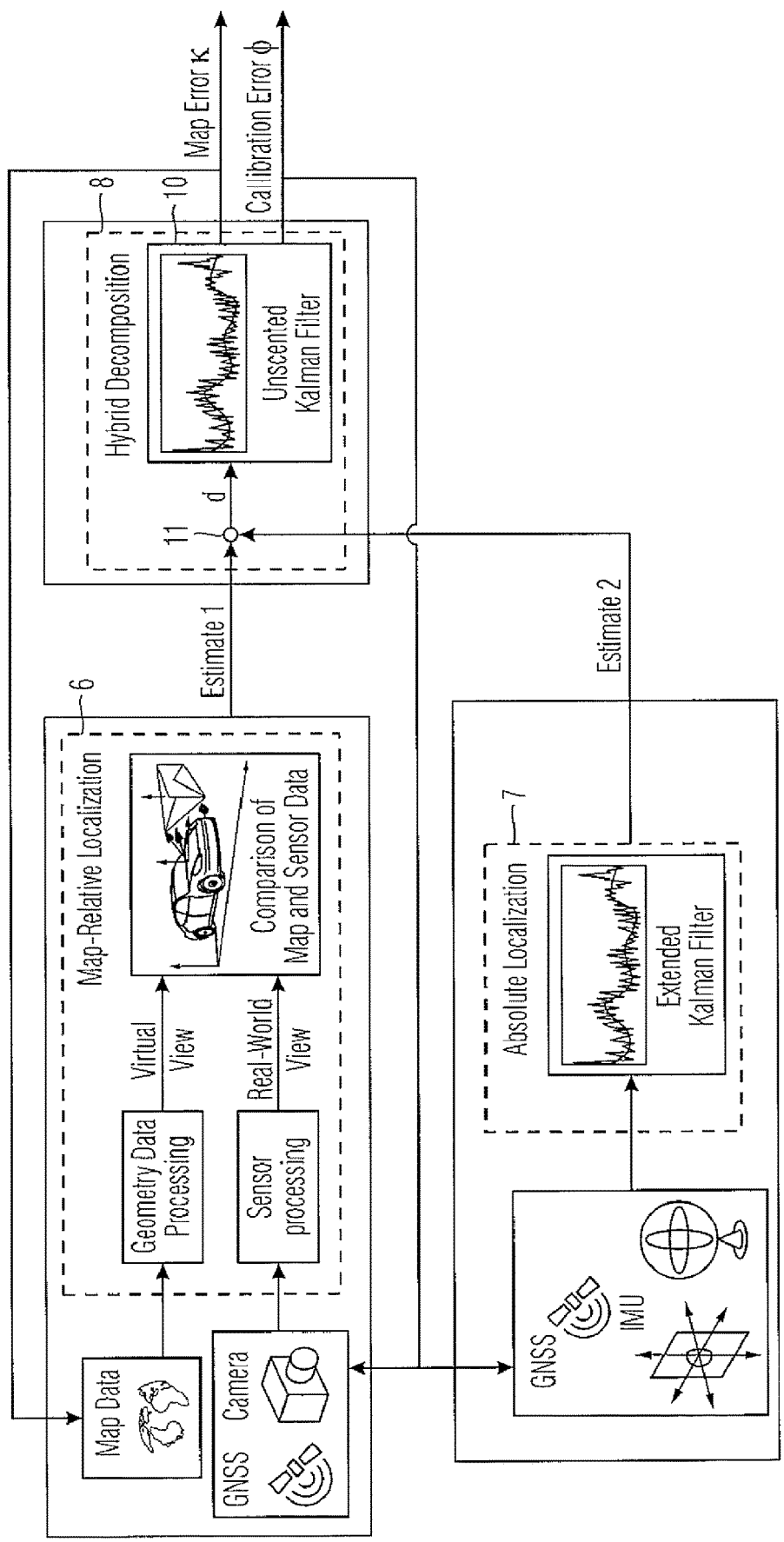
FIG. 5 shows a schematic structural diagram of the localization errors analyzing apparatus contained in the vehicle shown in FIG. 1.

FIG. 5 shows the hybrid decomposition module 8 that comprises an Unscented Kalman Filter (UKF) 10 to decompose the difference vector d into its the error components Φ and K and a combiner 11 that combines the current relative position estimated by the first localization module 6 and the current absolute position estimated by the second localization module 7 to generate the difference vector d, which is supplied to the Unscented Kalman Filter (UKF) 10. The errors Φ and K decomposed by the Unscented Kalman Filter (UKF) 10 are output to the computer 9 that corrects the map and sensor data.

The first localization module 6 provides an estimate that describes a relative position, e.g. with regard to the road geometry. The second localization module 7 serves to calculate a filtered absolute position estimate with state of the art methods, e.g. by using an Extended Kalman Filter that fuses IMU and GNSS. The mean of the GNSS related error is assumed to be zero. A difference vector d between map relative position and absolute position then is calculated by the combiner 11 and serves as an input for the Unscented Kalman Filter 10.

In the discussion of the embodiment, a translation error model for both, the map error and the calibration error is assumed. An input u contains the position and the orientation of the object. Since a map translation error m=(e, n) is assumed to be constant in the navigation frame and a calibration error c=(x, y) is constant in the body frame, a system model describing the state and its dynamics can be defined by:

$$x_k = \begin{pmatrix} \Phi_k^B \\ K_k^N \end{pmatrix}$$

$$x_{k|k-1} = f(x_{k-1}, u_k)$$

$$h(x_{k|k-1}, u) = R(\gamma)\Phi_k^B + K_k^N$$

$$y_k = h(x_{k|k-1}, u)$$

$$y_k = d_k$$

where the state is denoted with x, and the error components with Φ (orientation dependent) and K (orientation independent) respectively. Furthermore, R is the rotation matrix that performs the transformation from the body frame to the navigation frame. A vehicle heading y is included in the input u.

The state x, estimated by a recursive estimator, consists of the current calibration error denoted in body coordinates (x and y) $\Phi^B$ as well as the map related error $K^N$ denoted in the navigation frame.

A recursive estimator for estimating the state x may be implemented using a Kalman filter, which is used in the following description as one example.

Kalman filters follow a prediction-correction scheme. The system dynamic is expressed with a prediction function f on the state x.

The state x is predicted using the system dynamics and correct the state using the observed localization errors d and the observation model h, which is done sequentially. Doing this allows us to improve the estimate of $\Phi$ and K over time.

The prediction model f, with $x_{k|k-1}$ being the prediction of the future state, depends on the previous state $x_{k-1}$ and the control input u. Since a translation error model is selected, the state variables $\Phi^B$ and $K^N$ are assumed to be constant in their respective frame at the prediction step. The UKF needs to transform its prediction $x_{k|k-1}$ from state to measurement space. This is done by evaluating the observation function h, leading to get $y_k$. In other words, $y_k$ is the prediction of what should be observed if the state and the model are correct.

As soon as new estimates from both localization modules 6 and 7 are available, the correction step of the filter is performed. Here, the measured difference vector $d_k$ (being the difference of map relative and absolute position) is compared to the predicted $y_k$, leading to the innovation of the recursive estimator. The innovation is then used to update the state x.

Using the Kalman filter as recursive estimator, updating the state x can be performed using a Kalman gain.

The observed map error K relates to single segments only and is stored in a database for each segment individually. The calibration error $\Phi$ can be estimated continuously and independent of a certain map area or segment.

Based on its certainty in its own prediction as well as based on the expected noise of the measurements, an optimal state estimation is made. Over time, the calibration error in the navigation frame and the map error converge.

The decomposition of the two components K and $\Phi$ enables improving a vehicle's localization. Position estimation methods such as dead reckoning can benefit from this knowledge. Dead reckoning is based on the idea that positions are continuously estimated by using a previously determined position in combination with directional information (e.g. speed vectors). Knowing the components of the difference vector d then allows for a deduction of both future positions as well as future errors at that position which can be considered, leading to an improved position estimate. In order to achieve this, the invention assumes error models for each of the two error components $\Phi$ and K. However, the invention is not restricted to a specific error model. While the examples of error models discussed in the embodiment are time-invariant, the invention is not limited to time in-variant error models. Further embodiments of the invention may employ time-variant error models. A constraint for the error model employed by the invention is an observability by the hybrid decomposition module 8.

The orientation-independent errors K can be either caused by the map (e.g. a translation, a rotation, a scaling etc.) or by the second localization module 7 that works in an absolute reference frame (e.g. GNSS). While prior art usually concerns the latter case, the present invention addresses the first one or a combination of both cases. Assuming the errors induced by the localization modules to have a mean of zero over time or over repeated measurements, the orientation-independent error K can be used to improve the map. The correction works online and on single trips.

Since the statistical methods for the error estimation are used, a certainty measure is obtained additionally. Both, estimates and their certainty, can be shared since map errors are the same for every vehicle. Furthermore, multiple trips by the same or multiple vehicles can help to improve the certainty of the map correction. In the same way, the system can be used to calibrate the sensor modules on the vehicle.

Orientation dependent errors $\Phi$ can be traced back to the calibration of the sensor modules. Preferably, the focus is on the calibration with regard to the relation between the first localization module 6 and the second localization module 7. More specifically, calibration describes the geometric transformation between two modules. Reversing the conclusion, this means that the invention allows to calibrate one module if the position (and orientation) of the other one is known.

Furthermore, having a suitable estimate of one component ($\Phi$ or K) allows for statistically more confident estimation of the other one.

Figure 6:
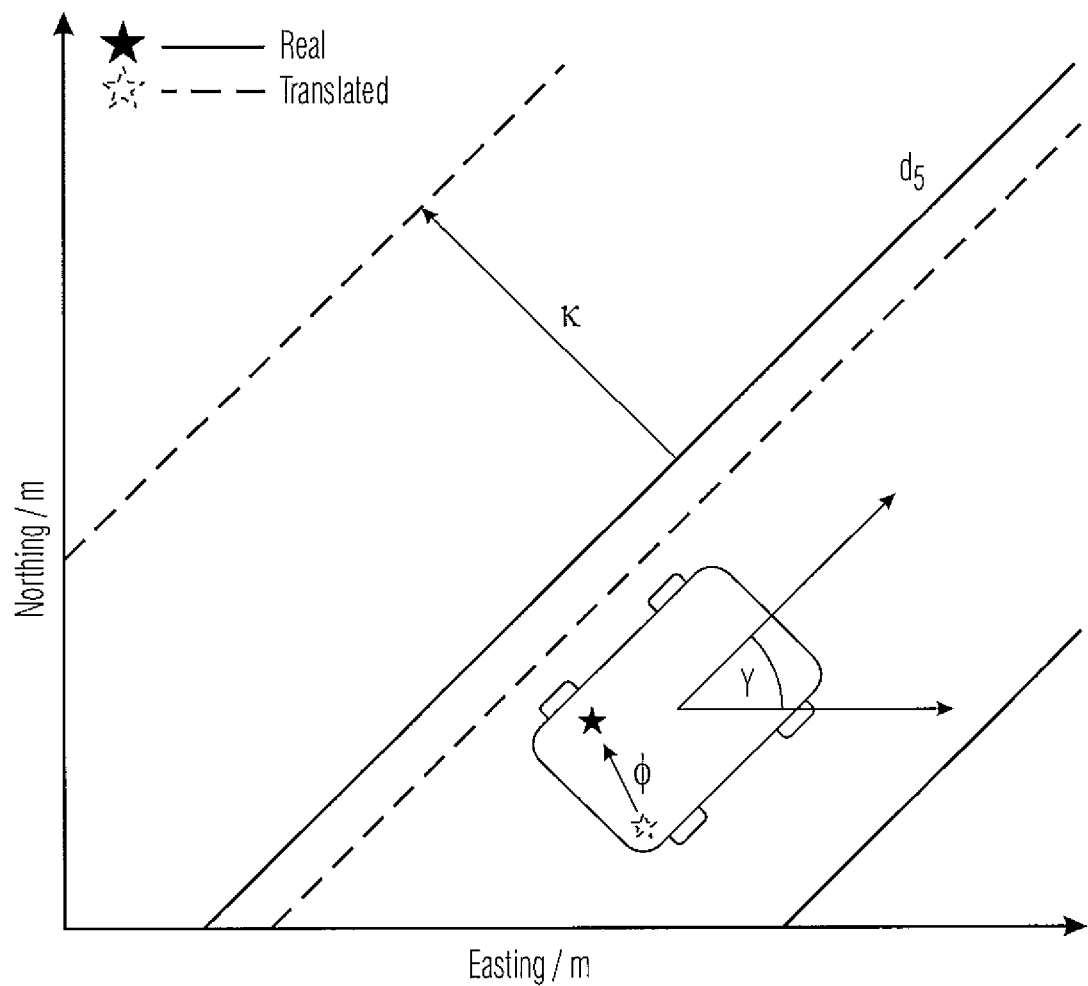
FIG. 6 shows the error components Φ and K decomposed by the analyzing apparatus.
Figure 7:
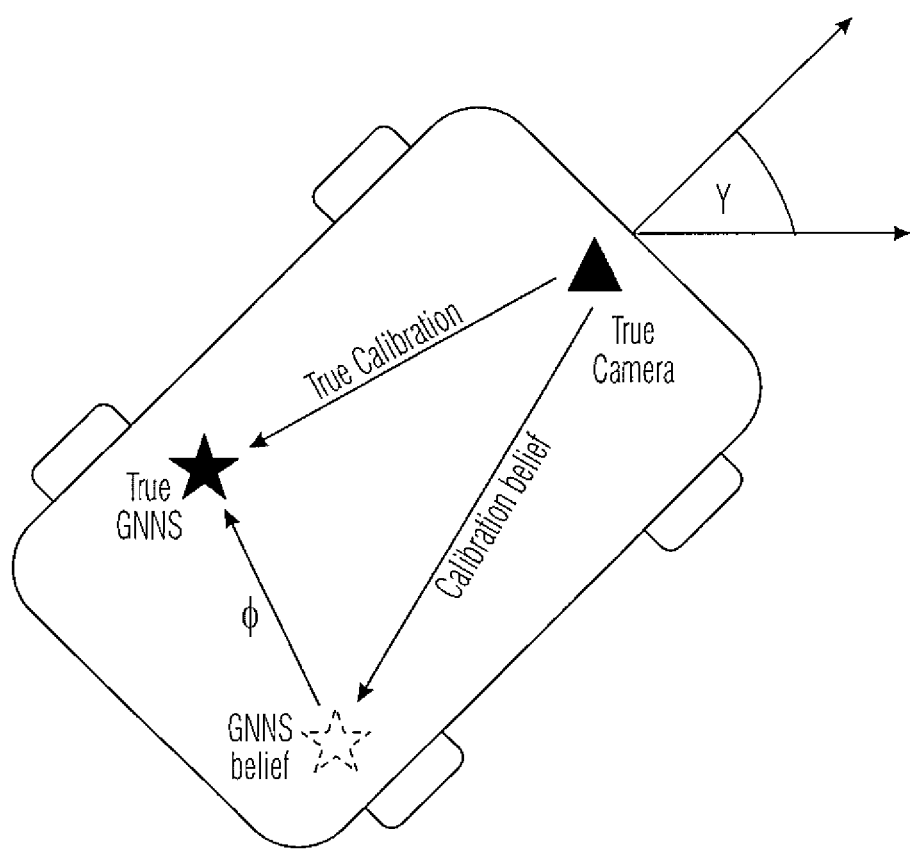
FIG. 7 shows the error Φ shown in FIG. 5 in more detail.

FIG. 6 shows an example in which the errors $\Phi$ and K have been decomposed, assuming translation based error models. K can now be used to correct the map, or more specifically to shift the map in the direction of K. FIG. 7 shows error $\Phi$ in more detail. In this case, the map relative position estimated by the first localization module 6 (camera sensor) is assumed to be correct while the absolute geographic position estimated by the second localization module 7 (GNSS receiver) is wrong. Using $\Phi$, the position estimated by the second localization module 7 can be corrected.

State-of-the-art localization solutions include a) absolute localization, b) map-relative localization or c) hybrid localization that uses the map for deriving constraints. However, they are subject to a wide range of requirements and are based on several assumptions. The apparatus of the present invention can work with state-of-the art low-cost sensors (e.g. a camera) as well as state-of-the art Global Navigation Satellite Systems (GNSS), which is cost efficient and globally available.

Current approaches either assume the map data to be accurate in a global sense or they accept and consider the fact that the used or generated map data may be wrong (e.g. translations) and tackle this issue by aligning measurements (e.g. ego-positions) with the map. In the latter case, the map serves as the global reference.

The present invention provides a system that leverages outputs of absolute and map-relative localization methods in order to improve localization, wherein an offset that is results from comparing map-relative and absolute localization is determined. The result is gaining knowledge on the source of the observed offset (also referred to as error) which then can be directly used for improved position estimation. Furthermore, the knowledge can be used for correcting systematic map errors and to calibrate vehicle sensors. This is done online, while driving. Furthermore, the present invention is suitable for single journeys and for individual agents.

The main advantages of the present invention are enabling accurate localization, map correction and vehicle-sensor calibration.

As to the map correction, highly accurate GNSS requires accurate map data. However, the generation of accurate map data is cumbersome and costly, which is worsened by the requirement to be always up-to-date. If map data is not commercially available, researchers tend to create their own map data by simultaneous localization and mapping (SLAM) or by following the record-and-relocate principle as disclosed in J. Levinson, M. Montemerlo, and S. Thrun, "Map-Based Precision Vehicle Localization in Urban Environments." in Robotics: Science and Systems, Atlanta, Ga., USA, 2007.

Mapmakers are investing a lot of resources and energy in the creation of highly accurate maps. Maps will be one of the cornerstones in the Intelligent Transportation Systems (ITS) domain. However, it is unlikely that such sophisticated maps will reliably be available in the near future at any location in the world.

The present invention can play an important role for future intelligent transportation systems such as cars, motorcycles, e-bikes. The present invention is advantageous for any Advanced Driver Assistance System (ADAS) or gadget that is based on maps and GNSS.

The present invention continues to work in cases of areas with bad electromagnetic signal reception such as in tunnels or urban canyons. A steady communication connection to a cloud is not required.

While map manufactures are concentrating on highways and major cities when creating high definition maps, especially rural areas, or any other place that is beyond this area of focus of the map manufacturer, can benefit from this invention.

The given implementation example refers to a vehicle. However, the present invention can be used for any other agent (2D and 3D) that moves within a mapped environment.

Furthermore, research and development activities can benefit from the present invention, e.g. when using a test course or areas where high definition map data is unavailable or hard to acquire.

The present invention is particularly relevant in the field of intelligent transportation systems.

Full explanation for nomenclature is listed below:

Map Alignment and Map Matching: In the sense of the present invention, the term map alignment is used for aligning sensor data (e.g. camera images) with map geometry to provide map-relative localization, while the term map matching is used for a planar assignment of measured geographic coordinates to a coordinate of the map data, e.g. to a lane centerline.

Absolute and Relative Positions: In literature, different definitions can be found when distinguishing localization and positioning. While positioning is often described as being the task of obtaining spatial coordinates, localization is referred to the task of finding the object's position in a map. To make the difference between global and local reference systems more clear, the term absolute localization is used for the present description of the invention. The term absolute localization describes a localization with regard to a global reference coordinate system, e.g. WGS84. This stands in opposition to the relative position of an object. In the case of map relative localization, the position of objects is determined with regard to an underlying (local) map. By knowing the position of a (local) map within the absolute frame, one can combine absolute and relative measurements.

Maps: In the present context, the expression high-definition maps refers to centimeter-level accuracy maps with close to no offset in an absolute sense while the maps suitable for the described invention can deviate from the global frame.

Systematic Map Errors: Observed errors in the map can be due to several reasons. The term systematic errors describes those errors that have been present when creating the map (e.g. leading to offsets) as opposed to errors in the map that are due to changes in the environment or reconstructions.

Segment: A road network consists of alternating segments and junctions. Several junctions at one location form an intersection.

Figure 8:
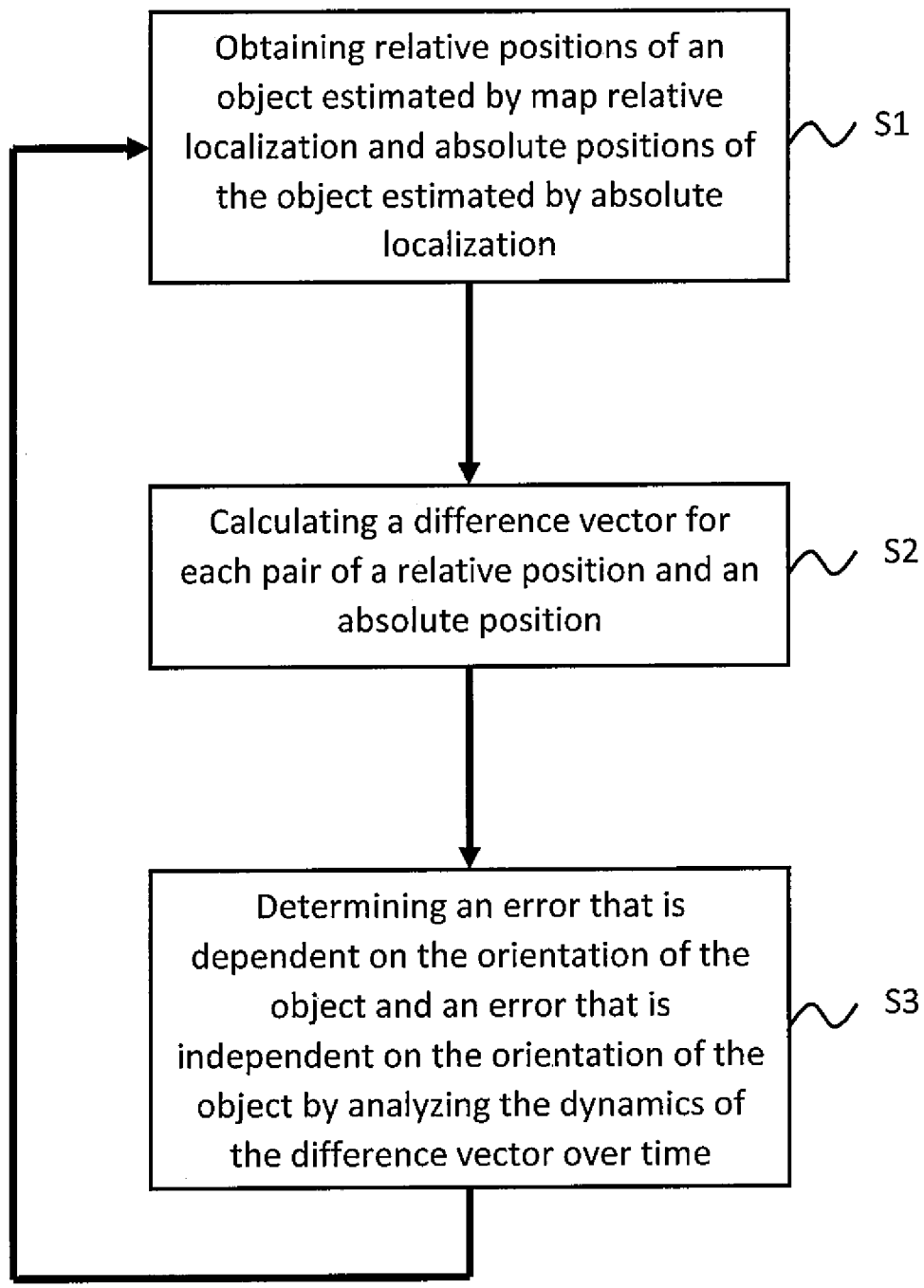
FIG. 8 shows a flowchart of the method according to an embodiment of the present invention.

FIG. 8 shows a flowchart of the method according to an embodiment of the present invention. In step S1, relative positions and absolute positions of an object (e.g. the ego-vehicle 1) moving within a mapped environment are obtained, wherein the relative position can be estimated by the first localization module 6 and the absolute position can be estimated by the second localization module 7. A difference vector for each pair of a relative position and an absolute position that relate to the same time is calculated in step S2. In step S3, an error that is dependent on the orientation of the object and an error that is independent on the orientation of the object are determined by analyzing the dynamics of the difference vectors over time. In particular, in step S3, the localization errors are decomposed into a systematic error that is dependent on the orientation of the object and into a systematic error that is dependent on the position of the object by analyzing the intrinsic dynamics of the localization errors. The steps S1 to S3 are repeated so that the systematic errors can be determined/analysed during the object is moving within a mapped environment. With the results of the error analysis, sensor and/or map data can be corrected or the sensors and/or Map Alignment process can be (re)calibrated.

The project leading to this application has received funding from the European GNSS agency under the European Union's Horizon 2020 research and innovation program under grant agreement No. 687458.

What is claimed is:

1. A method for analyzing localization errors, comprising the steps of:
    obtaining, from position estimation modules, relative positions and absolute positions of an object moving within a mapped environment, which are generated sequentially over time;
    calculating differences between the relative positions and absolute positions to determine sequential localization errors; and
    decomposing the localization errors into unrelated error components by analyzing intrinsic dynamics of the localization errors.

2. The method according to claim 1, wherein
    the unrelated error components comprise a systematic error that is dependent on the orientation of the object and a systematic error that is independent of the orientation of the object.

3. The method according to claim 2, wherein
    in the obtaining step, the absolute positions are obtained from one of the position estimation modules which is an absolute position estimation module by using at least one sensor.

4. The method according to claim 1, wherein
    in the obtaining step, the relative positions are obtained from one of the position estimation modules which is a map-relative position estimation module, in which a location of the object in a map is determined; and
    the method further comprises a step of correcting the map or the determined location based on the systematic error that is independent from the orientation of the object.

5. The method according to claim 3, wherein
the method further comprises a step of calibrating at least one of the position estimation modules based on the systematic error that is dependent on the orientation of the object.

6. The method according to claim 1, wherein
at least one of the relative positions and the absolute positions is estimated based on dead reckoning; and
the method further comprises a step of correcting the dead reckoning based on the systematic error that is dependent on the orientation of the object.

7. The method according to claim 1, wherein
in the calculating step, difference vectors of the relative positions and absolute positions are calculated.

8. The method according to claim 7, wherein
in the decomposing step, magnitudes and directions of the difference vectors are evaluated, wherein the magnitudes indicate error values, constant directions indicate the systematic error independent on the orientation of the object and non-constant directions indicate the systematic error dependent on the orientation of the object.

9. The method according to claim 1, wherein
in the decomposing step, the localization errors are decomposed by a sequential estimator, in particular a recursive estimator, an Unscented Kalman Filter or a model learning algorithm.

10. An apparatus for analyzing localization errors configured to carry out the method according to claim 1.

11. A driver assistance system comprising the apparatus according to claim 10.

12. A vehicle comprising the driver assistance system according to claim 11.

* * * * *